United States Patent Office 3,733,369
Patented May 15, 1973

3,733,369
PRODUCTION OF 2-METHYL-6-ETHYL-
HEPTA-2,6-DIENE
Lawrence H. Shepherd, Jr., Baton Rouge, La., assignor to
Ethyl Corporation, Richmond, Va.
No Drawing. Original application May 5, 1969, Ser. No.
822,046, now Patent No. 3,634,482. Divided and this
application July 26, 1971, Ser. No. 164,852
Int. Cl. C07c 1/00, 11/12
U.S. Cl. 260—680 R                    2 Claims

ABSTRACT OF THE DISCLOSURE

Nonionic organoaluminum compounds possessing an aluminacycloalkene moiety are prepared by causing interaction among aluminum, a conjugated diene (e.g., butadiene), an alkali metal aluminum tetrahydrocarbyl (e.g., sodium aluminum tetraethyl), and hydrogen, the reaction being conducted in the presence of a Lewis base (e.g., 1,4-dioxane) which is not excessively cleaved under the reaction conditions selected.

REFERENCE TO RELATED APPLICATION

This application is a division of my prior copending application Ser. No. 822,046, filed May 5, 1969 now U.S. Pat. 3,634,482.

This invention relates to the synthesis of cyclic organo-aluminum compounds, more particularly, compounds in which an aluminum atom is part of an olefinically unsaturated ring system.

BACKGROUND

Lehmkuhl, Angew. Chem. international edition 5, 663 (1966) indicates that reaction of butadiene with alkali metal in an ether in the presence of an amount of trimethylaluminum-ether adduct equivalent to the metal causes the formation of the complex:

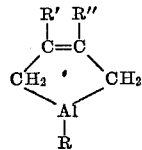

where M is lithium or sodium. This adduct is insoluble in aliphatic hydrocarbons and benzene. It decomposes above 150° C. without melting.

In copending application Ser. No. 771,651, filed Oct. 29, 1968 now U. S. Pat. 3,631,065, it is shown that nonionic organoaluminum compounds possessing an aluminacycloalkene moiety are produced by causing interaction among aluminum, a conjugated diene and a hydrocarbon aluminum hydride in the presence of a Lewis base capable of complexing with the nonionic organoaluminum compound without undergoing excessive cleavage. For example, when the diene reactant is butadiene or butadiene substituted in the two position or in the two and three positions, the principal product produced is characterized by the formula:

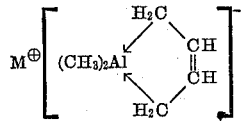

wherein R is a hydrocrabon group having up to about 18 carbon atoms; R' is a hydrogen, alkyl or alkenyl group; and R" is a hydrogen or alkyl group.

This invention involves, inter alia, the discovery that nonionic organoaluminum compounds possessing an aluminoacycloalkene moiety may be prepared by causing interaction among aluminum, a conjugated diene, an alkali metal aluminum tetrahydrocarbyl and hydrogen in the presence of certain Lewis bases. In conducting this reaction it is important to employ a Lewis base capable of complexing with the nonioanic orgnaoaluminum compound without undergoing excessive cleavage. For best results the reaction is conducted in such Lewis bases as tertiary amines, dialkyl ethers, cycloparaffinic monoethers having a six membered ring, or cycloparaffinic diethers having a five or six membered ring. A particularly suitable Lewis base is 1,4-dioxane as this compound is highly resistant to cleavage by the organoaluminum product even at elevated temperatures.

The cyclic organoaluminum compounds produced in this process possess an aluminacycloalkene moiety. For example, when 2,3-dimethyl butadiene is the diene employed in the process, the nonionic organoaluminum compound produced will contain the 3,4-dimethyl-alumina-cyclopent-3-ene moiety (i.e., the 3,4-dimethyl-1-alumina-cyclopent-3-ene-1-yl radical):

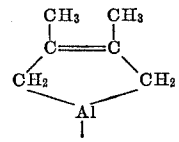

In other words, two-thirds of a chemical equivalent of aluminum is directly involved in forming an olefinically unsaturated ring system.

The available experimental evidence tends strongly to indicate that the cyclic aluminum compounds of this invention exist in different molecular forms. By way of illustration, when the diene reactant is butadiene or butadiene substituted in the two position or in the two and three positions, the principal product produced is characterized by the formula:

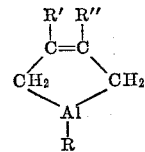

wherein R is a hydrocarbon group corresponding to the hydrocarbon group(s) present in the alkali metal aluminum tetrahydrocarbyl reactant, R' is a hydrogen, alkyl or alkenyl group, and R" is a hydrogen or alkyl group.

On the other hand, some of the product of the reaction appears to involve displacement of this R group and coupling of two aluminacycloalkene moieties via an alkylene group. In this case the product (when employing butadiene or butadiene substituted on either or both of the internal carbon atoms) is characterized by the formula:

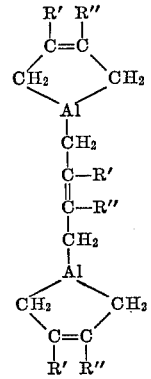

wherein R' is a hydrogen, alkyl or alkenyl group; and R" is a hydrogen or alkyl group.

The cyclic organoaluminum compounds produced by the process of this invention have a marked tendency to form complexes with Lewis bases and thus usually the product will involve complexation between the cyclic organoaluminum compound and the Lewis base in whose presence the reaction was conducted.

The aluminum used in the process of this invention may be in the form of chips, turnings, powder, or other similar particulated states. It is desirable, though not essential, to utilize an activated aluminum. Methods for producing activated aluminum are standard and well known in the art and reference may be had, for example, to U.S. 2,885,314; 2,892,738; 2,921,876; 3,100,786 and 3,104,252.

The diene reactant used in the present process is preferably a conjugated diene hydrocarbon having from 4 to about 18 carbon atoms in the molecule, and is exemplified by such substances as butadiene, isoprene, 2,3-dimethyl butadiene, 2-ethyl butadiene, mycrene, 1,4-dimethyl butadiene, 1,4-diphenyl butadiene, 2-phenyl butadiene, alpha-phellandrene, and the like. Also the diene may be substituted by innocuous radicals as in the case of chloroprene and 2,3-dichlorobutadiene. Dienes wherein the double bonds are in the terminal positions are usually most suitable.

The alkali metal aluminum tetrahydrocarbyl reactant of the process may be represented by the formula:

$$MAlR_4$$

where M is alkali metal (Li, Na, K, Rb, Cs) and the R groups may be the same or different and are hydrocarbyl groups, each of which may contain up to about 18 carbon atoms. The use of sodium aluminum tetrahydrocarbyls is preferred as these compounds are relatively inexpensive and highly reactive in the process. Ordinarily alkali metal aluminum tetraalkyls, especially sodium aluminum tetraalkyls, will be found most desirable from the cost-effectiveness standpoint, although use may be made of other alkali metal aluminum tetrahydrocarbyls such as the alkali metal aluminum tetraaryls, alkali metal aluminum tetraalkenyls, alkali metal aluminum cycloalkyls, alkali metal aluminum aralkyls, and the like.

A preferred operation is to form the alkali metal aluminum tetrahydrocarbyl in situ by introducing into the reaction zone an alkali metal (preferably sodium) and an aluminum trihydrocarbyl (preferably a trialkyl aluminum). The following reaction occurs:

$$3M + 4R_3Al \rightarrow 3MAlR_4 + Al$$

Suitable alkali metal aluminum tetrahydrocarbyls used in the process are exemplified by sodium aluminum tetramethyl, sodium aluminum tetraethyl, sodium aluminum tetraisobutyl, sodium aluminum tetradecyl, sodium aluminum tetraoctadecyl, sodium aluminum diethyl diphenyl, sodium aluminum dicyclohexyl dibutyl, sodium aluminum ethyl trimethyl, lithium aluminum tetraethyl, lithium aluminum tetrahexyl, potassium aluminum tetraisopropyl, potassium aluminum tetradecyl, and similar derivatives of rubidium or cesium.

Inasmuch as hydrogen is another reactant in the process, the operation will normally be conducted in a closed reaction vessel, such as an autoclave, containing an atmosphere of hydrogen. Therefore, the reaction will normally be conducted at elevated pressures, such as pressures ranging up to about 100 atmospheres or more, although if desired the reaction may be conducted at atmospheric pressure by passing a stream of gaseous hydrogen through the reaction system.

As noted above, reaction is conducted in the presence of a Lewis base having suitable chemical stability under the reaction conditions being utilized. In most cases this Lewis base will be employed as the principal reaction solvent—i.e., the reaction will be conducted in the Lewis base selected for use. However, if desired, the reaction may be effected in a suitable inert hydrocarbon medium (e.g., paraffinic or aromatic hydrocarbon solvents such as hexane, heptane, octane, decane, cyclohexane, benzene, toluene, xylenes, and the like) provided a proper amount of the Lewis base is also present in the reaction system. Ordinarily the system should contain at least 1–2 mols of Lewis base per mol of diene employed. Particularly convenient Lewis bases for use in the process are tertiary amines (e.g., trimethyl amine, dimethylethyl amine, triethyl amine, tributyl amine, triphenyl amine, tribenzyl amine, benzyldimethyl amine, N-methyl morpholine, N,N-diethyl aniline, N,N,N',N'-tetramethyl methylene diamine, N,N,N',N' - tetramethyl ethylene diamine, pyridine, N-methyl pyrrolidine, triethylene diamine, quinuclindine, and the like); dialkyl ethers (e.g., dimethyl ether, diethyl ether, diisopropyl ether, methylisoamyl ether, dibutyl ether, dihexyl ether and the like; cycloparaffinic monoethers having a six membered ring (e.g., tetrahydropyran—pentamethylene oxide—and ring alkylated derivatives thereof); and cycloparaffinic diethers having a five or six membered ring (e.g., 1,4-dioxane, 1,3-dioxane, 2-methyl-2-ethyl-1,3-dioxolane; and the like); and other similar substances which tend not to be excessively cleaved in the reaction, such as dicyclohexyl ether, dibenzyl ether, and the like.

The relative proportions of the reactants and reaction diluents do not appear to be critical as long as there is present a sufficient amount of each reactant to participate in the reaction.

In conducting the process for forming the cyclic organoaluminum compounds, elevated temperatures are employed. Generally, temperatures within the range of about 100 to about 180° C. will be found satisfactory, temperatures within the range of about 125 to about 175° C. being preferred. Naturally one should select a reaction temperature at which excessive cleavage of the Lewis base being used does not occur.

It will of course be understood that the reaction mixture should be kept essentially anhydrous and that exposure of the reaction system to air should be kept at a minimum.

The period of time during which the reactants interact with each other is susceptible to considerable variation and is generally discretionary. In general, the higher the reaction temperature, the shorter the reaction or contact time. The process may be conducted the reaction or contact time. The process may be conducted as a batch, semi-continuous, or continuous operation.

In order to still further appreciate the practice and advantages of this invention, reference should be had to the following illustrative examples.

EXAMPLE I

Reaction among aluminum, isoprene, sodium aluminum tetraethyl, and hydrogen

An autoclave was charged with aluminum powder (435 mmoles), isoprene (150 mmoles), sodium aluminum tetraethyl (12 mmoles), and 1,4-dioxane (100 ml.) The system was heated at 150° C. for three hours under 1000 p.s.i. hydrogen pressure. The principal product formed in the reaction was 1-ethyl-3-methyl-aluminacyclopent-3-ene dioxanate. The organoaluminum portion of this complex has the formula:

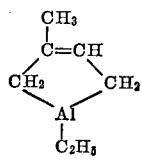

Material balance studies showed that it was produced in 65 percent yield based on the isoprene. Hydrolysis of a portion of the reaction solution with water at room temperature liberated a mixture of isopentenes. Vapor phase chromatography showed this isopentene mixture to be predominatly 2-methylbutene-1 and 3-methylbutene-1.

Repetition of Example I using diethyl ether, tetrahydropyran and N-methylpyrrolidine as the Lewis base solvent in lieu of the 1,4-dioxane gives rise to the formation of the corresponding complexes of 1-ethyl-3-methyl-aluminacyclopent-3-ene.

EXAMPLE II

Reaction among aluminum, myrcene, sodium aluminum tetraethyl, and hydrogen

Myrcene (150 mmoles), sodium aluminum tetraethyl (18 mmoles), and aluminum powder (10 grams) are added to 100 milliliters 1,4-dioxane and heated at 150° C. under 1000 p.s.i. hydrogen for three hours. The aluminacycloalkene product of this reaction is 1-ethyl-3-(4-methyl-3-pentenyl)-aluminacyclopent-3-ene:

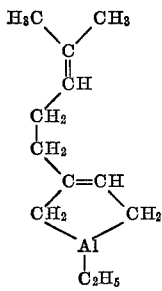

Hydrolysis of the 3-(4-methyl-3-pentenyl)-aluminacyclopent-3-ene moiety with water followed by aqueous HCl at 0–25° C. results in the liberation of 2-methyl-6-ethyl-hepta-2,6-diene. This is a highly selective reaction in that little if any other diene is formed. It will be noted that during the course of the hydrolysis, a shift of the double bond in the aluminacyclopent-3-ene moiety occurs:

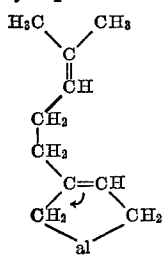

Ordinarily, 2-methyl-6-ethyl-hepta-2,6-diene is produced by the catalytic hydrogenation of myrcene. See, for example, J. L. Simonsen, The Terpenes, vol. I, p. 18 or Dupont and Desreux, Bull. Soc. Chim. 5 [v], 931 (1938). Unfortunately, however, this reduction reaction is not clean and the thermodynamically more stable isomer 2,6-dimethyl-octa-2,6-diene is also produced:

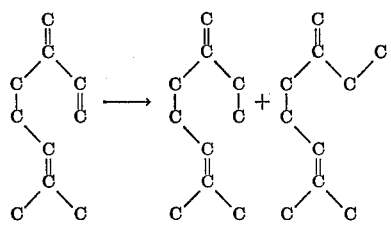

Hence, another embodiment of this invention is the provision of a process for the preparation of 2-methyl-6-ethylhepta-2,6-diene which comprises hydrolyzing the 3-(4-methyl-3-pentenyl)-aluminacyclopent-3-ene moiety. This hydrolysis may be effected at a temperature within the range of from about 0 to about 60° C. It is brought about by means of water or aqueous mineral acids such as HCl, H$_2$SO$_4$, HNO$_3$, H$_3$PO$_4$, etc.

Further examples of this invention include reaction among butadiene, sodium aluminum tetrabutyl, activated aluminum powder, and hydrogen in dibutyl ether whereby 1-butyl-aluminacyclopent-3-ene dibutyl etherate is produced; reaction among 2-ethyl butadiene, potassium aluminum tetramethyl, activated aluminum powder, and hydrogen in tetrahydropyran whereby 1-methyl-3-ethyl-aluminacyclopent-3-ene tetrahydropyranate is produced; and reaction among 2,3-dimethyl butadiene, lithium aluminum tetrahexyl, activated aluminum powder, and hydrogen in 1,4-dioxane whereby 1-hexyl-3,4-dimethyl-aluminacyclopent-3-ene dioxanate is formed.

Other reactions of this invention will now be evident to those skilled in the art.

As will be evident from the above description, the cyclic nonionic organoaluminum compounds which may be produced by the process of this invention may be readily hydrolyzed by water or with aqueous mineral acids or bases whereby olefins are produced. These olefins have the skeletal configurations of the hydrocarbon portion of the aluminacycloalkene moiety present in the nonionic organoaluminum compound being hydrolyzed. However, the position of the double bond in the liberated olefin is dependent to some extent upon the hydrolysis conditions employed. In many cases it is possible, for example, to produce either alpha-olefins or olefins containing an internal double bond.

The cyclic nonionic organoaluminum compounds which may be produced by the process of this invention readily cleave cycloparaffinic monoethers having three or four membered rings (i.e., epoxides and oxetanes). The resulting organoaluminum product on hydrolysis yields a branched chain alkenol whose carbon content corresponds to the sum of the carbon atoms of the diene used in forming the initial cyclic aluminum compound and of the cycloparaffinic monoether reacted therewith.

Another important use for the cyclic nonionic organoaluminum compounds which may be produced by the process of this invention is to subject them to controlled oxidation with air, oxygen, or air enriched with gaseous oxygen whereby a new class of polyoxygenated cyclic nonionic organoaluminum compounds is produced. By way of example, oxidation (air, 0° C., 1 hour in 1,4-dioxane) of compounds of the general formula:

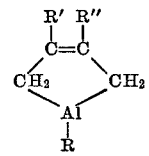

gives rise to the formation of compounds of the formula:

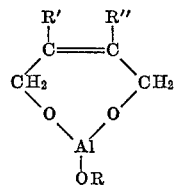

wherein R is a hydrocarbon group having up to about 18 carbon atoms (most preferably a lower alkyl group); R' is a hydrogen, alkyl or alkenyl group; and R'' is a hydrogen or alkyl group. Hydrolysis of these polyoxygenated cyclic nonionic organoaluminum compounds (e.g., using water or moist air at 0–25° C., preferably followed by treatment with dilute aqueous mineral acid) results in the formation of diols having the corresponding skeletal configurations. Many such diols have novel structures and interesting properties.

The cyclic nonionic organoaluminum compounds which may be produced by the process of this invention may also be used in forming catalyst systems to be employed in the same general fashion as the conventional Ziegler catalyst systems. By way of example, these cyclic nonionic organoaluminum compounds may be used in conjunction with conventional transition metal containing catalyst ingredients (e.g., the halides, alkoxides, or chelates of titanium, zirconium, vanadium or the like) in much the same way as alkyl aluminum compounds are now used. Polymers which may be produced in this manner include polyethylene, polypropylene, ethyl-propylene copolymers and terpolymers, poly-4-methylpentene-1, and other olefin polymers and synthetic rubbers or elastomers.

I claim:

1. The process of preparing 2-methyl-6-ethyl-hepta-2,6-diene which comprises hydrolyzing with water or aqueous mineral acid at a temperature within the range of from about 0 to about 60° C. an organoaluminum compound in which a 3-(4-methyl-3-pentenyl)-aluminacyclopent-3-ene moiety is attached by means of an aluminum-carbon bond to a hydrocarbon group which optionally may be substituted by no more than one additional so-bonded 3-(4-methyl-3-pentenyl)-aluminacyclopent-3-ene moiety.

2. The process of claim 1 wherein the hydrolysis is effected with water followed by aqueous HCl at 0–25° C.

References Cited

UNITED STATES PATENTS 3,631,065   12/1971   Brendel et al. ____ 260—448 A X

PAUL M. COUGHLAN, JR., Primary Examiner